(12) United States Patent
Sugiarto et al.

(10) Patent No.: US 12,719,848 B1
(45) Date of Patent: Aug. 25, 2026

(54) ZERO-TRUST REMOTE ACCESS TO MULTI-LAYER NETWORKS

(71) Applicant: Xage Security, Inc., Palo Alto, CA (US)

(72) Inventors: Andy Sugiarto, Palo Alto, CA (US); Ravilochan Shamanna, San Jose, CA (US); Ganesh Jampani, Gilroy, CA (US)

(73) Assignee: Xage Security, Inc., Palo Alto, CA (US)

( * ) Notice: Subject to any disclaimer, the term of this patent is extended or adjusted under 35 U.S.C. 154(b) by 222 days.

(21) Appl. No.: 18/362,481

(22) Filed: Jul. 31, 2023

(51) Int. Cl.
*H04L 9/06* (2006.01)
*H04L 9/40* (2022.01)

(52) U.S. Cl.
CPC ...... *H04L 63/0815* (2013.01); *H04L 63/0236* (2013.01); *H04L 63/029* (2013.01); *H04L 63/20* (2013.01)

(58) Field of Classification Search
CPC ............. H04L 63/0815; H04L 63/0236; H04L 63/029; H04L 63/20
See application file for complete search history.

(56) References Cited

U.S. PATENT DOCUMENTS

2009/0064304 A1* 3/2009 Cohen .................. H04L 63/029 726/11
2014/0108665 A1* 4/2014 Arora .................... H04L 67/563 709/227

(Continued)

OTHER PUBLICATIONS

Wikimedia Foundation, Inc., Purdue Enterprise Reference Architecture, downloaded Feb. 28, 2024, <https://en.wikipedia.org/w/index.php?title=Purdue_Enterprise_Reference_Architecture&oldid=1182878031>, 3 pages.

(Continued)

*Primary Examiner* — Noura Zoubair
(74) *Attorney, Agent, or Firm* — Baker Botts L.L.P.

(57) ABSTRACT

In one embodiment, a computer-implemented method comprises using one or more computing devices that are communicatively coupled to one or more internetworking devices in two or more logical layers of a multiple-layer distributed computing environment, the logical layers comprising at least an operational technology (OT) network and an information technology (IT) network, configuring one or more network firewalls in one or more of the logical layers to admit UDP protocol traffic on one or more specified ports; using the one or more computing devices, setting a current logical network layer to a lowest logical layer of the multiple-layer distributed computing environment; using the one or more computing devices, opening a secure tunnel using the internetworking stack of a first authentication service node at the current logical network layer; using the one or more computing devices, initiating secure tunnel communication toward a second authentication service node at a next higher logical layer of the computing environment; using the one or more computing devices, setting the current logical network layer to be the next higher logical layer, and repeating the opening and initiating one or more times between the current logical layer and the next successive higher logical layer; using the one or more computing devices, synchronizing user access policies between the first authentication service node and the second authentication service node using state synchronization messages communicated through the secure tunnel.

14 Claims, 5 Drawing Sheets

(56) References Cited

U.S. PATENT DOCUMENTS

| | | | | |
|---|---|---|---|---|
| 2023/0040607 | A1* | 2/2023 | Henry | H04L 45/64 |
| 2023/0344921 | A1* | 10/2023 | Duraisamy | H04L 63/0272 |
| 2024/0007400 | A1 | 1/2024 | Cao | |
| 2024/0019823 | A1* | 1/2024 | Capoccia | H04L 63/0272 |
| 2024/0022609 | A1 | 1/2024 | Smith | |

OTHER PUBLICATIONS

T.J. Williams, The Purdue Enterprise Reference Architecture, IFAC 12th Triennial World Congress, Sydney, Australia, 1993, pp. 559-564.

* cited by examiner

Fig. 1

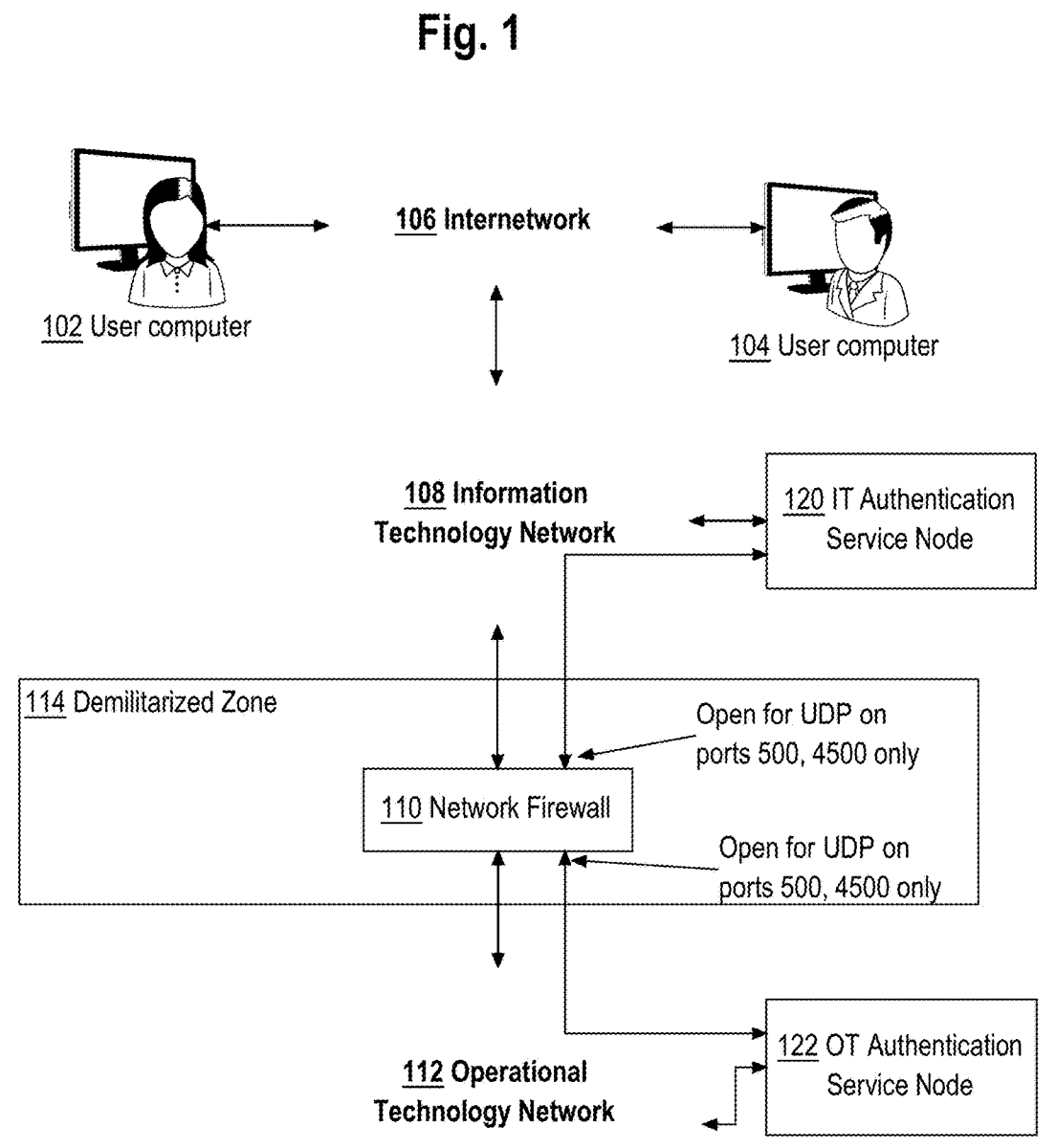

102 User computer

104 User computer

106 Internetwork

108 Information Technology Network

120 IT Authentication Service Node

114 Demilitarized Zone

110 Network Firewall

Open for UDP on ports 500, 4500 only

Open for UDP on ports 500, 4500 only

112 Operational Technology Network

122 OT Authentication Service Node

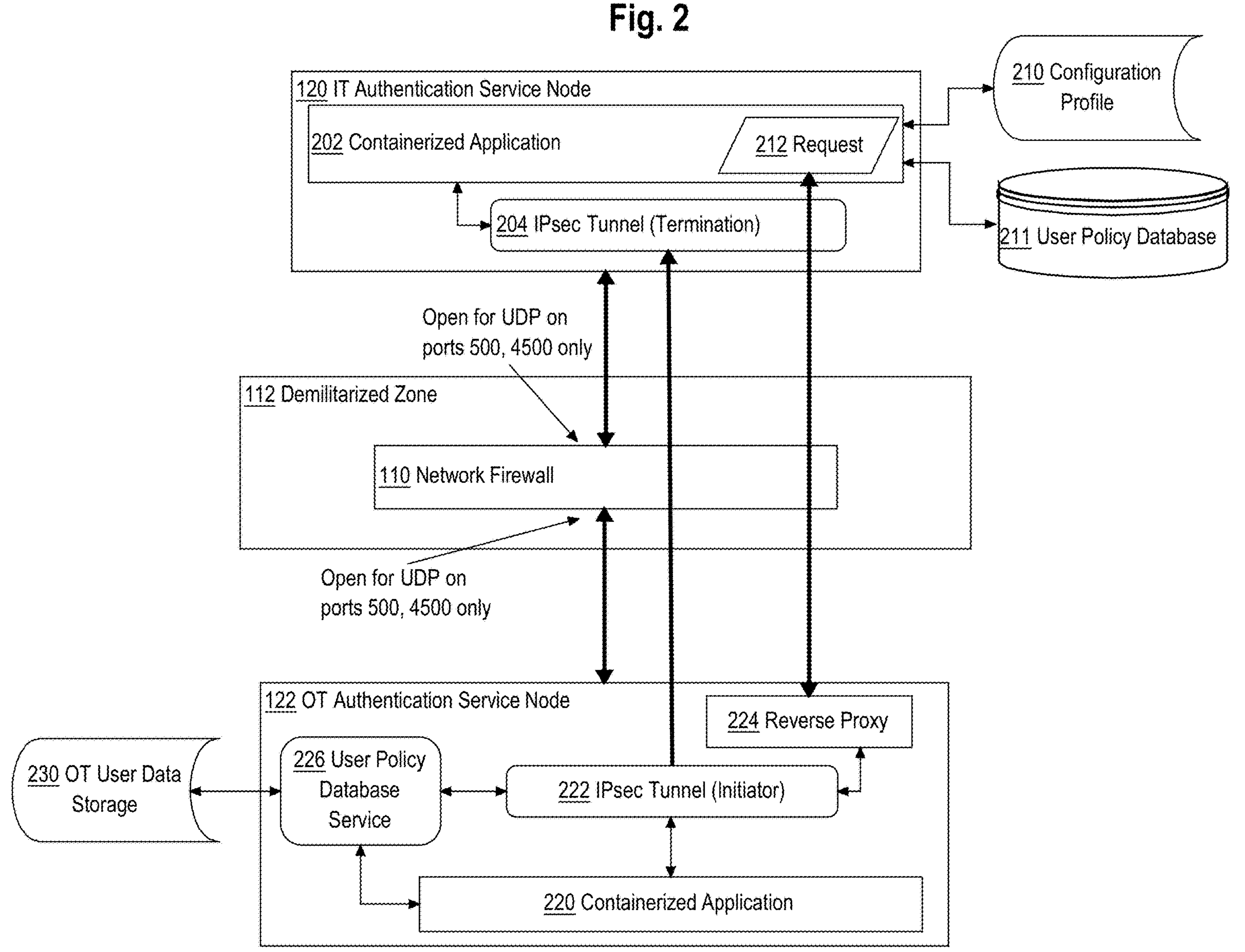

Fig. 2
120 IT Authentication Service Node
202 Containerized Application
212 Request
204 IPsec Tunnel (Termination)
210 Configuration Profile
211 User Policy Database
Open for UDP on ports 500, 4500 only
112 Demilitarized Zone
110 Network Firewall
Open for UDP on ports 500, 4500 only
122 OT Authentication Service Node
224 Reverse Proxy
230 OT User Data Storage
226 User Policy Database Service
222 IPsec Tunnel (Initiator)
220 Containerized Application

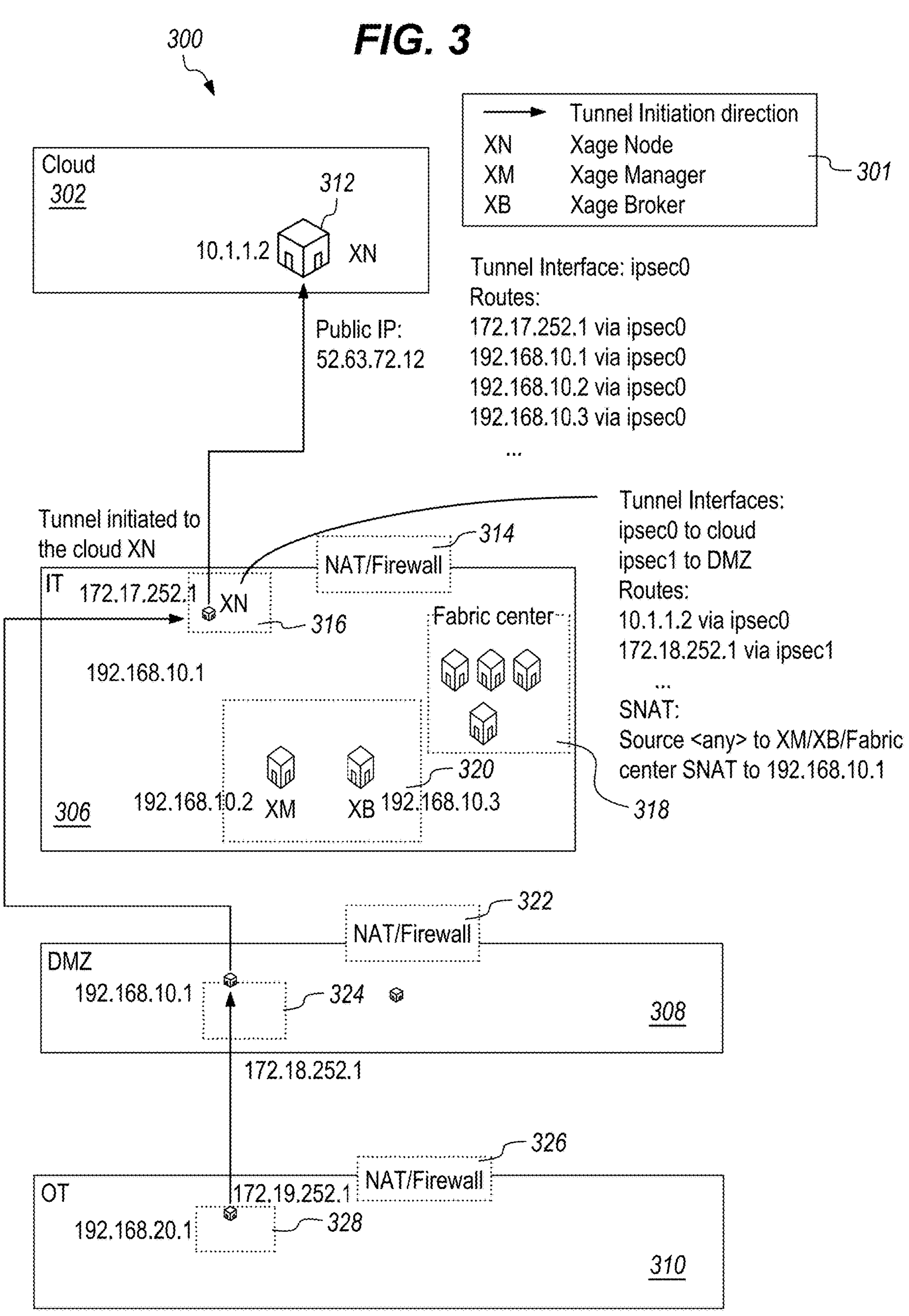

FIG. 3
300
Tunnel Initiation direction
XN Xage Node
XM Xage Manager
XB Xage Broker
301
Cloud
302
312
10.1.1.2
XN
Public IP:
52.63.72.12
Tunnel Interface: ipsec0
Routes:
172.17.252.1 via ipsec0
192.168.10.1 via ipsec0
192.168.10.2 via ipsec0
192.168.10.3 via ipsec0
...
Tunnel initiated to the cloud XN
314
NAT/Firewall
Tunnel Interfaces:
ipsec0 to cloud
ipsec1 to DMZ
Routes:
10.1.1.2 via ipsec0
172.18.252.1 via ipsec1
...
SNAT:
Source <any> to XM/XB/Fabric center SNAT to 192.168.10.1
IT
172.17.252.1
XN
316
Fabric center
192.168.10.1
320
192.168.10.2
XM
XB
192.168.10.3
306
318
322
NAT/Firewall
DMZ
192.168.10.1
324
308
172.18.252.1
326
NAT/Firewall
OT
172.19.252.1
192.168.20.1
328
310

Figure 4:
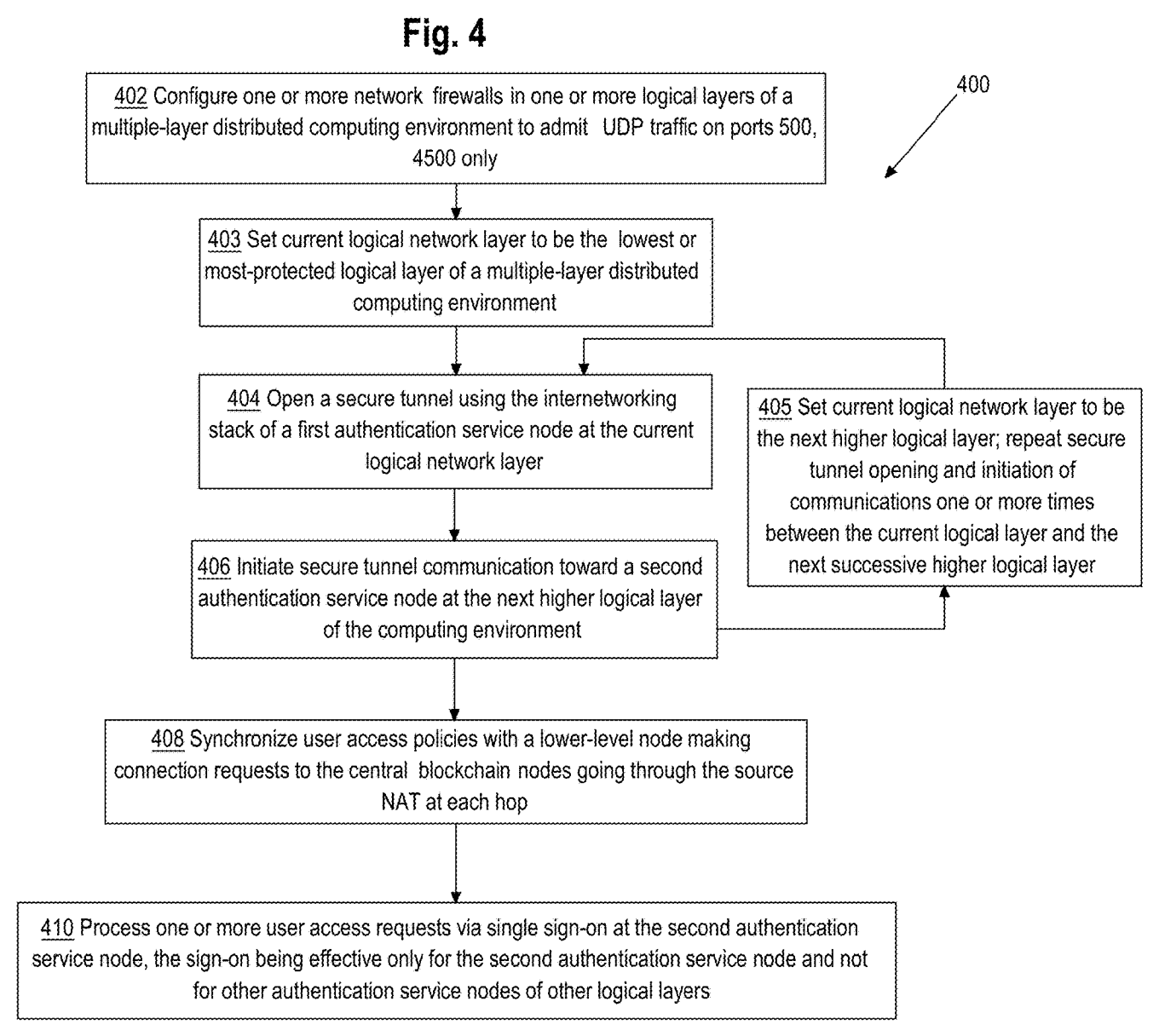

402 Configure one or more network firewalls in one or more logical layers of a multiple-layer distributed computing environment to admit UDP traffic on ports 500, 4500 only 403 Set current logical network layer to be the lowest or most-protected logical layer of a multiple-layer distributed computing environment 404 Open a secure tunnel using the internetworking stack of a first authentication service node at the current logical network layer 405 Set current logical network layer to be the next higher logical layer; repeat secure tunnel opening and initiation of communications one or more times between the current logical layer and the next successive higher logical layer 406 Initiate secure tunnel communication toward a second authentication service node at the next higher logical layer of the computing environment 408 Synchronize user access policies with a lower-level node making connection requests to the central blockchain nodes going through the source NAT at each hop 410 Process one or more user access requests via single sign-on at the second authentication service node, the sign-on being effective only for the second authentication service node and not for other authentication service nodes of other logical layers

ZERO-TRUST REMOTE ACCESS TO MULTI-LAYER NETWORKS

TECHNICAL FIELD

One technical field of the present disclosure is network security, including user authentication, as applied to operational technology (OT) networks.

BACKGROUND

The approaches described in this section are approaches that could be pursued but not necessarily approaches that have been previously conceived or pursued. Therefore, unless otherwise indicated, it should not be assumed that any of the approaches described in this section qualify as prior art merely by virtue of their inclusion in this section.

Distributed computer systems for industrial control, utility control, and other demanding physical environments are commonly organized using Operational Technology (OT) networks isolated, for security purposes, from Information Technology (IT) networks using network firewalls. An OT network includes internetworking gear, engineering workstations or other computing devices, and non-computing devices that may be directly or closely coupled to elements of an industrial system, such as turbines, pumps, valves, motors, and other apparatus. The IT network includes general-purpose computing devices and networking gear and is typically used for management, data analysis, and higher-level applications rather than direct industrial control operations.

Recommendations of the United States National Institutes for Science and Technology (NIST) for securing OT networks mandate the creation of Demilitarized Zones (DMZs) between OT and IT networks. Further, all requests for access and/or network traffic from and to the OT networks must pass through intermediate nodes in the DMZs. Therefore, OT network nodes are typically not directly reachable from the IT networks. However, to provide Role Based Access Control (RBAC) to the devices in the OT network for users or user accounts that have been established in the IT network and to enable authenticating users, user accounts, or requests at all layers of a multi-layer distributed computing environment, an authentication service node must run in the IT network, and synchronize data with nodes in the OT network.

The networking environment described above complicates the communication of user data, user policies, and authentication data across system layers, including between the OT and IT networks. In particular, network security analysts have developed an acute need for better ways to facilitate user access to the devices in the OT network with a single sign-in at the authentication service node in the IT network while fully satisfying the security requirements of the access protocol from IT network to terminate at one level below, as required under the Purdue model of industrial control system (OT) security. Furthermore, security architects need improved ways to achieve synchronization of user access policies across authentication nodes of different network layers while respecting the NIST guidelines and the Purdue model.

SUMMARY

The appended claims may serve as a summary of the invention.

BRIEF DESCRIPTION OF THE DRAWINGS

In the drawings:

FIG. 1 illustrates a distributed computer system showing the context of use and principal functional elements with which one embodiment could be implemented.

FIG. 2 illustrates an example of the system of FIG. 1 with additional detail on possible implementations of authentication service nodes, according to one embodiment.

FIG. 3 illustrates another example of an internetworking architecture that can implement the techniques of FIG. 1, with additional detail concerning the configuration of firewalls and other nodes.

FIG. 4 illustrates an example process of configuring and using the systems of FIG. 1, FIG. 2, or FIG. 3.

DETAILED DESCRIPTION

Figure 5:
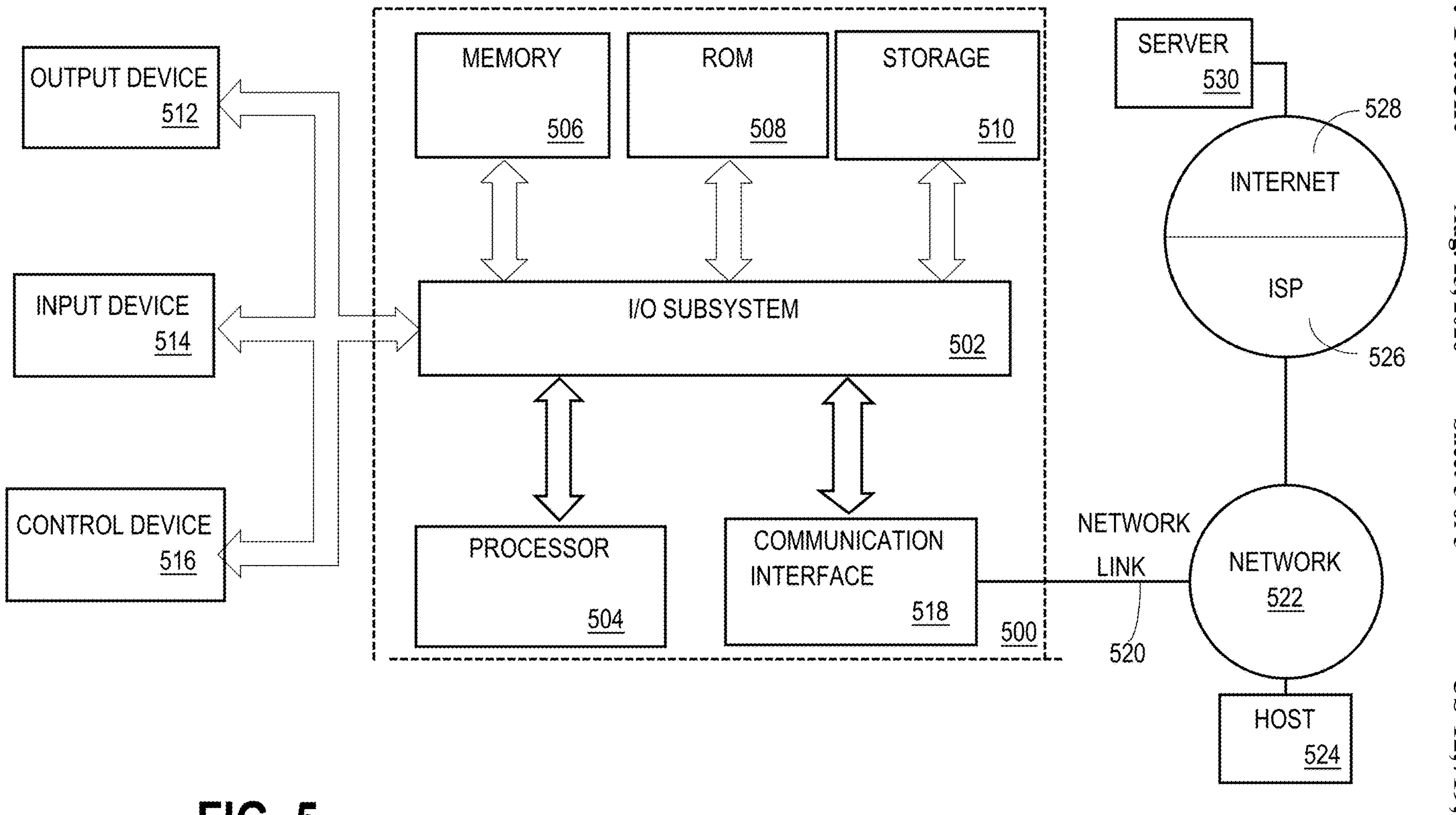
FIG. 5 illustrates a computer system with which one embodiment of an authentication service node could be implemented.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

The text of this disclosure, in combination with the drawing figures, is intended to state in prose the algorithms that are necessary to program the computer to implement the claimed inventions at the same level of detail that is used by people of skill in the arts to which this disclosure pertains to communicate with one another concerning functions to be programmed, inputs, transformations, outputs and other aspects of programming. That is, the level of detail set forth in this disclosure is the same level of detail that persons of skill in the art normally use to communicate with one another to express algorithms to be programmed or the structure and function of programs to implement the inventions claimed herein.

This disclosure may describe one or more different inventions, with alternative embodiments to illustrate examples. Other embodiments may be utilized, and structural, logical, software, electrical, and other changes may be made without departing from the scope of the particular inventions. Various modifications and alterations are possible and expected. Some features of one or more of the inventions may be described with reference to one or more particular embodiments or drawing figures, but such features are not limited to usage in the one or more particular embodiments or figures with reference to which they are described. Thus, the present disclosure is neither a literal description of all embodiments of one or more of the inventions nor a listing of features of one or more of the inventions that must be present in all embodiments.

Headings of sections and the title are provided for convenience but are not intended to limit the disclosure in any way or as a basis for interpreting the claims. Devices that are described as in communication with each other need not be in continuous communication with each other unless expressly specified otherwise. In addition, devices that are in communication with each other may communicate directly or indirectly through one or more intermediaries, logical or physical.

A description of an embodiment with several components in communication with one other does not imply that all such components are required. Optional components may be described to illustrate a variety of possible embodiments and to illustrate one or more aspects of the inventions fully. Similarly, although process steps, method steps, algorithms, or the like may be described in sequential order, such processes, methods, and algorithms may generally be configured to work in different orders unless specifically stated to the contrary. Any sequence or order of steps described in this disclosure is not a required sequence or order. The steps of described processes may be performed in any order practical. Further, some steps may be performed simultaneously. The illustration of a process in a drawing does not exclude variations and modifications, does not imply that the process or any of its steps are necessary to one or more of the invention(s), and does not imply that the illustrated process is preferred. The steps may be described once per embodiment but need not occur only once. Some steps may be omitted in some embodiments or some occurrences, or some steps may be executed more than once in a given embodiment or occurrence. When a single device or article is described, more than one device or article may be used in place of a single device or article. Where more than one device or article is described, a single device or article may be used instead of more than one device or article.

The functionality or features of a device may be alternatively embodied by one or more other devices that are not explicitly described as having such functionality or features. Thus, other embodiments of one or more of the inventions need not include the device itself. Techniques and mechanisms described or referenced herein will sometimes be described in singular form for clarity. However, it should be noted that particular embodiments include multiple iterations of a technique or multiple manifestations of a mechanism unless noted otherwise. Process descriptions or blocks in figures should be understood as representing modules, segments, or portions of code, including one or more executable instructions for implementing specific logical functions or steps in the process. Alternate implementations are included within the scope of embodiments of the present invention in which, for example, functions may be executed out of order from that shown or discussed, including substantially concurrently or in reverse order, depending on the functionality involved.

1. General Overview

Embodiments of the disclosure provide internetworking architectures, network configuration techniques, and computer-implemented processes to connect multiple authentication service nodes of different network levels, including IT networks and OT networks, while maintaining respect for present models and guidelines for security in sensitive network environments. In an embodiment, user accounts or user computers can be devices in the OT network with a single sign-in at an authentication service node in the IT network while fully satisfying the security requirements of the access protocol from the IT network to terminate at one level below, as specified in the Purdue model. Embodiments enable secure, controlled synchronization of user access policies among authentication nodes in different network layers. One technique to achieve these results is to configure network firewalls of DMZs to admit network traffic only for the UDP protocol and ports "500" and "4500."

Generally, the authentication service nodes of different network layers execute one or more containerized applications to provide authentication services, state synchronization, and other functions. Internetworking elements of a distributed system are configured to enable application containers running in the authentication service nodes to communicate with containers running in a different authentication service node using one or more secure tunnels using a protocol such as IPsec. A lower-level authentication service node opens a secure tunnel and initiates message traffic toward a second authentication service node at a higher level. Embodiments are programmed to establish additional tunnels automatically as additional authentication service nodes are deployed at different network levels based on a centrally generated configuration profile.

An application running in an authentication node of the IT network transmits requests from user applications to obtain user access to the devices in the lowest level, typically a high-security OT network layer. These requests pass through a chain of reverse proxies running in the authentication service node of the levels logically below the IT network. A user policy database service running in the authentication service node of the OT level can synchronize data with a central database running in the IT node without special action across the different network levels, using multiple IPsec tunnels and using source network address translation after reaching a termination endpoint of each tunnel. Thus, end-to-end communication between a containerized application of the authentication service node of the OT network, and a containerized service running in an authentication service node of the IT network, uses the OSI network layer via the chain of IPsec tunnels and a source NAT to the destination node IP address after each tunnel hop.

Embodiments encompass the subject matter of the following numbered clauses:

1. A computer-implemented method comprising using one or more computing devices that are communicatively coupled to one or more internetworking devices in two or more logical layers of a multiple-layer distributed computing environment, the logical layers comprising at least an operational technology (OT) network and an information technology (IT) network, configuring one or more network firewalls in one or more of the logical layers to admit UDP protocol traffic on one or more specified ports; using the one or more computing devices, setting a current logical network layer to a lowest logical layer of the multiple-layer distributed computing environment; using the one or more computing devices, opening a secure tunnel using the internetworking stack of a first authentication service node at the current logical network layer; using the one or more computing devices, initiating secure tunnel communication toward a second authentication service node at a next higher logical layer of the computing environment; using the one or more computing devices, setting the current logical network layer to be the next higher logical layer, and repeating the opening and initiating one or more times between the current logical network layer and the next successive higher logical layer; using the one or more computing devices, synchronizing user access policies between the first authentication service node and the second authentication service node using state synchronization messages communicated through the secure tunnel.

2. The method of clause 1, wherein the secure tunnel is an IPsec tunnel.

3. The method of clause 1, wherein the lowest logical layer of the multiple-layer distributed computing environment is the OT network.

4. The method of clause 1, wherein the next successive higher logical layer of the multiple-layer distributed computing environment comprises any of the IT network, a demilitarized zone (DMZ), or a cloud layer.

5. The method of clause 1, further comprising configuring the one or more network firewalls in one or more of the logical layers to admit UDP protocol traffic on port "500" and port "4500".

6. The method of clause 1, at least the second authentication service node being programmed to process one or more user access requests via a single sign-on at the second authentication service node, the single sign-on being effective only for the second authentication service node and not for other authentication service nodes of other logical layers.

7. The method of clause 1, wherein one or more of the initiating and the synchronizing further comprise communicating network traffic via one or more reverse proxies.

8. The method of clause 1, wherein one or more of the initiating and the synchronizing further comprise performing source network address translation of network traffic at the one or more network firewalls.

2. Structural & Functional Overview

2.1 Distributed Computer System Example

FIG. 1 illustrates a distributed computer system showing the context of use and principal functional elements with which one embodiment could be implemented. In an embodiment, the system of FIG. 1 comprises components that are implemented at least partially by hardware at one or more computing devices, such as one or more hardware processors executing stored program instructions stored in one or more memories for performing the functions that are described herein. In other words, all functions described herein are intended to indicate operations that are performed using programming in a special-purpose computer or general-purpose computer in various embodiments. FIG. 1 illustrates only one of many possible arrangements of components configured to execute the programming described herein. Other arrangements may include fewer or different components, and the division of work between the components may vary depending on the arrangement.

FIG. 1, and the other drawing figures and all of the description and claims in this disclosure, are intended to present, disclose and claim a technical system and technical methods in which specially programmed computers, using a special-purpose distributed computer system design, execute functions that have not been available before to provide a practical application of computing technology to the problem of secure communications between authentication service nodes in multi-layer computing environments with IT networks and OT networks. In this manner, the disclosure presents a technical solution to a technical problem, and any interpretation of the disclosure or claims to cover any judicial exception to patent eligibility, such as an abstract idea, mental process, method of organizing human activity, or mathematical algorithm, has no support in this disclosure and is erroneous.

In one embodiment, one or more user computers 102, 104 are communicatively coupled via an internetwork 106 to an information technology (IT) network 108. Internetwork 106 broadly represents one or more local area networks, wide area networks, or internetworks, connected using any of wired or wireless links and terrestrial or satellite network links, or a combination. Internetwork 106 can be envisioned as the public internet. The IT network 108 hosts or runs an IT authentication service node 120. A demilitarized zone (DMZ) 114 having a network firewall 110 separates the IT network 108 from an operational technology (OT) network 112, which runs an OT authentication service node 122.

Typically the network firewall 110 is configured to terminate all network traffic arriving from IT network 108 and potentially outside from internetwork 106, to require packet-level inspection or protocol-level inspection. To reach OT network 112, firewall 110 must initiate a separate connection to the OT network if the traffic is allowed. In an embodiment of the techniques herein, network firewall 110 has ports "500" and "4500" open for UDP traffic to facilitate communication between the authentication service nodes 120, 122, as further described herein in other sections.

For purposes of illustrating a clear example, FIG. 1 shows one IT network 108 and one OT network 112, but other embodiments can have many more networks or logical layers. For example, a single IT network 108 can be communicatively coupled via the DMZ 114, and potentially several DMZs, to multiple different OT networks 112.

FIG. 2 illustrates an example of the system of FIG. 1 with additional detail on possible implementations of authentication service nodes, according to one embodiment. The IT authentication service node 120 hosts or executes a containerized application 202, which is communicatively coupled to a configuration profile 210 and a user policy database 211. The containerized application 202 is programmed to execute authentication operations in response to receiving one or more requests 212, messages, and/or programmatic calls from devices or accounts in network layers that are logically above the IT authentication service node 120. The containerized application 202 is programmed also to execute state synchronization operations with other authentication service nodes. Configuration profile 210 provides a centralized reference for the configuration of multiple tunnels, firewalls, and proxies across a multi-layer distributed system, as further described. The user policy database 211 digitally stores records, keyed to user identifiers or user account identifiers, specifying roles, access privileges, and related access metadata.

The OT authentication service node 122 hosts or executes a containerized application 220, which is communicatively coupled to a user policy database service 226. The containerized application 220 is programmed to execute authentication operations in response to receiving one or more requests, messages, and/or programmatic calls from devices or accounts in network layers that are logically above the OT authentication service node 122; in some embodiments, the application is programmed to independently authenticate the same request 212 when it reaches the OT network layer. The containerized application 220 is programmed also to execute state synchronization operations with other authentication service nodes. For example, containerized application 220 can receive data from configuration profile 210 and/or user policy database 211 through messages that the IT authentication service node 120 initiates and synchronize the data to local, OT user data storage 230 via a user policy database service 226.

Embodiments are programmed to require a login and authentication to a specific node within the IT network 108 before processing a request 212; there is no intent to give direct access to devices in the OT network 112 to users, user accounts, or requests inbound from the IT network or other layers above it. For example, if the OT network 112 comprises a security camera or item of machinery that is reachable via SSH or HTTP, then the user is expected to log in, obtain authentication, and act in accordance with access controls that may or may not allow the use of particular devices and/or particular protocols with those devices.

FIG. 3 illustrates another example of an internetworking architecture that can implement the techniques of FIG. 1, with additional detail concerning the configuration of firewalls and other nodes. FIG. 3 illustrates a multi-layer distributed computing system 300. As shown in legend 301, throughout FIG. 3 the IPsec tunnels are initially single-directional, with arrows indicating the direction of initial network traffic after a tunnel is opened; however, bidirectional traffic can traverse a tunnel after it is opened. Nodes can be but are not required to be, configured as a Xage Node, Xage Manager, or Xage Broker using multi-layer authentication software commercially available from Xage Security, Inc., Palo Alto, California. For purposes of this disclosure, each Xage Node can be considered an authentication service node.

In an embodiment, system 300 comprises a lowest-level OT network 310, which is protected using a NAT/firewall device 326, programmed to open an IPsec tunnel from a node 328 having an endpoint IP of 192.168.20.1, and directed to and terminating in DMZ 308. For this purpose, node 328 can be configured statically with an IP address of node 324 at the time that node 328 is deployed in the OT network 310. On successful establishment of the IPsec tunnel, the node 328 is assigned a virtual IP of 172.19.252.1.

The DMZ 308 is protected by a separate NAT/firewall device 322. The DMZ 308 is programmed to open a second IPsec tunnel using node 324 with an IP of 192.168.20.1 and is directed to and terminating at a processing node 316 of IT network 306. On successfully establishing the IPsec tunnel, node 328 is assigned a virtual IP of 172.18.252.1.

In the IT network 306, while node 316 can be any computing device, in some embodiments, the node is configured as a Xage Node. A third NAT/firewall device 314 protects the IT network 306, which can comprise a plurality of other nodes 320, such as a manager node and a broker node, and a fabric center 318 having one or more server computers, server clusters, virtual compute instances, and/or virtual storage instances. Node 316 opens tunnel interfaces "ipsec0" toward and terminating in a cloud layer 302, based on knowledge of the routable IP address of node 312 in the cloud layer, initiates IPsec traffic toward the cloud layer, and maintains a tunnel interface "ipsec1" to terminate the tunnel from the DMZ, configured with a plurality of routes to the cloud layer and DMZ.

Cloud layer 302 comprises node 312, having a publicly routable IP address and a tunnel interface "ipsec0" configured with a plurality of routes to nodes 316, 320. End users or their computers, such as user computers 102, 104 of FIG. 1, typically will connect to cloud layer 302 or node 312, or applications running in them, to initiate contact with the OT network. Users initially authenticate via node 312.

Cloud layer 302 can further comprise a proxy service hosted in node 312 that establishes a connection to a compatible proxy service of node 316, which can proxy traffic to node 324, which can proxy traffic to node 328. This arrangement forms a proxy chain from client to device in the OT network. Furthermore, the architecture respects security guidance that requires protocol breaks at layer boundaries, as each proxy terminates any inbound connection and independently initiates an outbound connection to another layer.

As tunnel traffic originating from node 328 exits OT network 310, the NAT/firewall device 326 can be programmed to execute source network address translation (SNAT) operations on the UDP port "4500" traffic to conceal the true address within the OT network 310 of the node. A similar SNAT operation can happen at NAT/firewall device 322 and 314.

Thus, in an embodiment, multiple discrete layers of a distributed system including a protected OT network, a DMZ, and an IT network each initiate directional IPsec tunnels toward the next higher layer, and no further, thus one hop at a time. In effect, multiple tunnels form a network connecting all relevant authentication nodes to facilitate synchronization. In one embodiment, the lowest-level, highest-security level should open the first, upwardly directed IPsec tunnel and initiate traffic on it, with higher, less secure layers successively opening tunnels and initiating traffic. More secure layers initiate traffic upward to less secure layers, and the more secure layers are otherwise protected using NAT/firewall devices. SNAT is employed as needed to conceal lower-layer network addresses from higher-layer devices. Authentication and re-authentication can occur at each node 328, 324, 316 to limit the extent of a cyberattack. Consequently, the disclosed architecture enables multiple authentication nodes at different layers of a sensitive, highly protected system to communicate with one another to synchronize authentication data or exchange profile information; however, external users or public internet traffic cannot transit the distributed system except in compliance with strict security controls enforced at the authentication nodes, and NAT/firewall devices.

Implementations do not require modifying the NAT/firewall devices other than to permit IPsec traffic.

As with FIG. 1, FIG. 2, the architecture of FIG. 3 can use any number of logical layers or network layers, and the specific number of layers shown in FIG. 3 is not required. In more complex deployments, such as topologies with multiple IT networks or OT networks and/or multiple zones within an OT network, each node 328, 316 can be programmed to use routing tables to select the correct tunnel to transmit traffic directed to a desired network or zone. For example, with two IT networks IT1 and IT2, inbound requests specifying a particular OT device can be resolved at node 316 using digitally stored mapping tables that associate sessions, requests, or devices with particular IPsec tunnel identifiers. Inbound requests can come from the IT network or from cloud-based applications or services that are logically outside or above the IT network.

2.2 Example Data Processing Flows

FIG. 4 illustrates an example process of configuring and using the systems of FIG. 1, FIG. 2, or FIG. 3. FIG. 4 and each other flow diagram herein is intended as an illustration of the functional level at which skilled persons, in the art to which this disclosure pertains, communicate with one another to describe and implement algorithms using programming. The flow diagrams are not intended to illustrate every instruction, method object, or sub-step that would be needed to program every aspect of a working program but are provided at the same functional level of illustration that is normally used at the high level of skill in this art to communicate the basis of developing working programs.

In an embodiment, process 400 initiates execution at block 402 and is programmed to configure one or more network firewalls in one or more logical layers of a multiple-layer distributed computing environment to admit UDP traffic on ports "500" and "4500" only. For example, block 402 can comprise configuring a network firewall of a DMZ that separates the lowest or most-protected logical layer of a multiple-layer distributed computing environment from a higher logical layer of the computing environment to admit UDP traffic on ports "500" and "4500". Other firewalls that protect other layers can be similarly configured. For example, with the topology of FIG. 3, NAT/firewall devices 314, 322, 326 can all be configured as specified. Block 402 can execute by NAT/firewall devices 314, 322, 326, and/or network firewall 110 (FIG. 1) loading data from configuration profile 210 specifying port opening configurations and opening ports "500" and "4500" for UDP traffic in response to the profile. In an embodiment, block 402 can execute using command-line interface (CLI) operations under program control or script control or using the manual entry of CLI.

At block 403, the process is programmed to set a value of a current logical network layer to be the lowest or most-protected logical layer of a multiple-layer distributed computing environment. Block 403 refers to setting the values of programmatic variables of a script program or other program that executes to implement some or all steps of FIG. 4. Block 403 can include accessing or reading topology data, a network management database, or other configuration data that defines the multiple-layer distributed computing environment in terms of numbers of layers, static or dynamic IP addresses of elements in the layers, routing paths or tunnels to layers, or other topology, routing, or access data. The specific means of implementing block 403 are not critical, provided that process 400 has a way to determine the topology of a target network and identify a logical network layer and/or its elements at which internetworking protocol changes can be made.

At block 404, the process is programmed to open a secure tunnel using the internetworking stack of a first authentication service node at the current logical network layer. In an embodiment, block 404 can comprise establishing secure communication at the internet layer of the OSI model, rather than using protocols that operate above the network layer, such as TLS or SSH. Block 404 can comprise mutual authentication between nodes at the ends of the tunnel, initiated from an authentication node of the current logical network layer, and the negotiation of cryptographic keys to use during a session between that node and an endpoint node at a higher logical layer. In one embodiment, the secure tunnel is opened as an IPsec tunnel, but establishing a VPN is not required even though IPsec is often used for VPNs.

In an embodiment, the current layer will initially be the lowest or most-protected logical layer of the multiple-layer distributed computing environment. For example, containerized application 220 of the OT authentication service node 122 can be programmed to open an IPsec tunnel 222 toward the IT authentication service node 120 with a termination point 204. Alternatively, with the topology of FIG. 3, block 404 can represent an iteration in which node 328 is configured with a tunnel directed to node 324 of DMZ 308. Opening IPsec tunnels and initiating traffic as described herein can be implemented as part of a node's boot or startup sequence when it begins operation.

Importantly, tunnel 222 is directional and will not support two-way network traffic unless and until the containerized application 220 of the OT authentication service node 122 initiates a message toward the IT authentication service node 120. As shown in block 406, process 400 is programmed to initiate IPsec tunnel communication toward a second authentication service node at a higher logical layer of the computing environment. Initial messages could be a handshake, ping, or other test messages to confirm the completion of a connection and/or good communication or substantive messages, as shown in block 408.

In one embodiment, after block 406, process 400 transfers control programmatically to block 405, which is programmed to set the current logical network layer to be the next higher logical layer and to repeat IPsec tunnel opening and initiation of communications one or more times between the current logical layer and the next successive higher logical layer. For example, with the topology of FIG. 3, block 405 can represent an iteration in which node 324 is configured with a tunnel directed to node 316, and/or where node 316 is configured with a tunnel directed to node 312 of cloud layer 302. The logical loop represented by blocks 404, 406, 405 can execute any number of times depending on the number of layers or zones in a network topology. The term "logical layer" in any block of FIG. 4 can refer to OT networks or zones, IT networks or zones, DMZs, cloud networks, or other networks that are external to, separate from, or logically distinct from an OT network and IT network of a particular entity or enterprise.

Once the OT authentication service node 122 initiates a message toward the IT authentication service node 120, or when any other lower-layer node initiates traffic on a tunnel toward a higher-level node, then two-way traffic can proceed, the traffic including but not limited to messages exchanged for synchronizing state data. As shown in block 408, process 400 is programmed to synchronize user access policies between the first authentication service node and the second authentication service node using state synchronization messages communicated through a chain of reverse proxies and the IPsec tunnel. Thus, the user policy database synchronization is with the lower level node, making connection requests to the central blockchain-protected nodes via going through the source NAT at every hop. Specifically, this communication does not go through a chain of reverse proxies. However, the user-to-device access goes through a chain of reverse proxies.

Other operations also can proceed asynchronously with respect to block 408 once the IPsec tunnel is open. For example, at block 410, the process is programmed to process one or more user access requests via a single sign-on at the second authentication service node, the sign-on being effective only for the second authentication service node and not for other authentication service nodes of other logical layers. The user computer 102 could perform a single sign-on at the IT authentication service node 120, for example, but would have to re-authenticate when requests or message traffic traverse the DMZ to the OT authentication service node 122. Inbound requests can come from the IT network or from cloud-based applications or services that are logically outside or above the IT network.

Subsequent requests of a user or application to interoperate with, access, or configure a specific device in the OT layer typically identify the device using an abstract name. These requests arrive at an edge node 316 (FIG. 3), which can maintain or access a mapping at node 316, one of the nodes 320, or in the fabric center 318, that maps all configured devices of the OT layer to an IPsec path on which they can be reached. Node 316 then can forward, directly or by interoperating with one or more routers or switches in the IT network 306, the request toward the specific device in the OT network 310 via the DMZ 308. Further, devices or applications in the OT network 310 can use the same paths established in the manner described herein to reach nodes in the cloud layer 302; for example, a user, request, or application could select a device in the OT network, log into that device, then select a node in the cloud layer to work with. Other specific details of these routing operations, such as whether the NAT/firewalls allow such northbound traffic or require special configuration, are outside the scope of this disclosure.

One approach in the present problem domain might be to establish a VPN between a pair of layers, with a different VPN for every pair of layers in a distributed system. Thus, traversing three zones would require at least two VPNs, with all attendant complexity involved in VPN configuration and corresponding reconfiguration of firewalls. The present approaches avoid these complications, offering a far simpler, easier-to-deploy approach.

3. Implementation Example—Hardware Overview

According to one embodiment, the techniques described herein are implemented by at least one computing device. For example, a computing device can implement one or more of nodes 312, 316, 320, 324, 328, and/or NAT/firewall devices 314, 322, 326. The techniques may be implemented in whole or in part using a combination of at least one server computer and/or other computing devices that are coupled using a network, such as a packet data network. The computing devices may be hard-wired to perform the techniques or may include digital electronic devices such as at least one application-specific integrated circuit (ASIC) or field programmable gate array (FPGA) that is persistently programmed to perform the techniques or may include at least one general purpose hardware processor programmed to perform the techniques pursuant to program instructions in firmware, memory, other storage, or a combination. To accomplish the described techniques, such computing devices may also combine custom hard-wired logic, ASICs, or FPGAs with custom programming. The computing devices may be server computers, workstations, personal computers, portable computer systems, handheld devices, mobile computing devices, wearable devices, body-mounted or implantable devices, smartphones, smart appliances, internetworking devices, autonomous or semi-autonomous devices such as robots or unmanned ground or aerial vehicles, any other electronic device that incorporates hard-wired and/or program logic to implement the described techniques, one or more virtual computing machines or instances in a data center, and/or a network of server computers and/or personal computers.

FIG. 5 illustrates a computer system with which one embodiment of nodes 312, 316, 320, 324, 328, and/or NAT/firewall devices 314, 322, 326 could be implemented; other embodiments can omit one or more elements, such as some or all of the specified input devices or output devices that facilitate human use. For example, certain firewall routers respond to command-line interfaces (CLIs) or programmatic calls and do not require cursor-pointing devices or display devices. In some cases, one or more of nodes 312, 316, 320, 324, 328 can be implemented as a software service running on a computer, router, switch, or other internetworking gear that runs other services for other purposes.

In the example of FIG. 5, a computer system 500 and instructions for implementing the disclosed technologies in hardware, software, or a combination of hardware and software, are represented schematically, for example, as boxes and circles, at the same level of detail that is commonly used by persons of ordinary skill in the art to which this disclosure pertains for communicating about computer architecture and computer systems implementations.

Computer system 500 includes an input/output (I/O) subsystem 502, which may include a bus and/or other communication mechanism(s) for communicating information and/or instructions between the components of the computer system 500 over electronic signal paths. The I/O subsystem 502 may include an I/O controller, a memory controller, and at least one I/O port. The electronic signal paths are represented schematically in the drawings, for example, as lines, unidirectional arrows, or bidirectional arrows.

At least one hardware processor 504 is coupled to I/O subsystem 502 for processing information and instructions. Hardware processor 504 may include, for example, a general-purpose microprocessor or microcontroller and/or a special-purpose microprocessor such as an embedded system or a graphics processing unit (GPU), or a digital signal processor or ARM processor. Processor 504 may comprise an integrated arithmetic logic unit (ALU) or may be coupled to a separate ALU.

Computer system 500 includes one or more units of memory 506, such as a main memory, which is coupled to I/O subsystem 502 for electronically digitally storing data and instructions to be executed by processor 504. Memory 506 may include volatile memory such as various forms of random-access memory (RAM) or another dynamic storage device. Memory 506 also may be used for storing temporary variables or other intermediate information during the execution of instructions to be executed by processor 504. Such instructions, when stored in non-transitory computer-readable storage media accessible to processor 504, can render computer system 500 into a special-purpose machine that is customized to perform the operations specified in the instructions.

Computer system 500 further includes non-volatile memory such as read-only memory (ROM) 508 or other static storage devices coupled to I/O subsystem 502 for storing information and instructions for processor 504. The ROM 508 may include various forms of programmable ROM (PROM), such as erasable PROM (EPROM) or electrically erasable PROM (EEPROM). A unit of persistent storage 510 may include various forms of non-volatile RAM (NVRAM), such as FLASH memory, solid-state storage, magnetic disk, or optical disks such as CD-ROM or DVD-ROM and may be coupled to I/O subsystem 502 for storing information and instructions. Storage 510 is an example of a non-transitory computer-readable medium that may be used to store instructions and data which, when executed by the processor 504, cause performing computer-implemented methods to execute the techniques herein.

The instructions in memory 506, ROM 508, or storage 510 may comprise one or more instructions organized as modules, methods, objects, functions, routines, or calls. The instructions may be organized as one or more computer programs, operating system services, or application programs, including mobile apps. The instructions may comprise an operating system and/or system software; one or more libraries to support multimedia, programming, or other functions; data protocol instructions or stacks to implement TCP/IP, HTTP, or other communication protocols; file format processing instructions to parse or render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. The instructions may implement a web server, web application server, or web client. The instructions may be organized as a presentation layer, application layer, and data storage layer such as a relational database system using a structured query language (SQL) or no SQL, an object store, a graph database, a flat file system, or other data storage.

Computer system 500 may be coupled via I/O subsystem 502 to at least one output device 512. In one embodiment, output device 512 is a digital computer display. Examples of a display that may be used in various embodiments include a touchscreen display, a light-emitting diode (LED) display, a liquid crystal display (LCD), or an e-paper display. Computer system 500 may include other types of output devices 512, alternatively or in addition to a display device. Examples of other output devices 512 include printers, ticket printers, plotters, projectors, sound cards or video cards, speakers, buzzers or piezoelectric devices or other audible devices, lamps or LED or LCD indicators, haptic devices, actuators or servos.

At least one input device 514 is coupled to I/O subsystem 502 for communicating signals, data, command selections, or gestures to processor 504. Examples of input devices 514 include touch screens, microphones, still and video digital cameras, alphanumeric and other keys, keypads, keyboards, graphics tablets, image scanners, joysticks, clocks, switches, buttons, dials, slides, and/or various types of sensors such as force sensors, motion sensors, heat sensors, accelerometers, gyroscopes, and inertial measurement unit (IMU) sensors and/or various types of transceivers such as wireless, such as cellular or Wi-Fi, radio frequency (RF) or infrared (IR) transceivers and Global Positioning System (GPS) transceivers.

Another type of input device is a control device 516, which may perform cursor control or other automated control functions such as navigation in a graphical interface on a display screen, alternatively or in addition to input functions. The control device 516 may be a touchpad, a mouse, a trackball, or cursor direction keys for communicating direction information and command selections to processor 504 and for controlling cursor movement on an output device 512 such as a display. The input device may have at least two degrees of freedom in two axes, a first axis (e.g., x) and a second axis (e.g., y), that allows the device to specify positions in a plane. Another type of input device is a wired, wireless, or optical control device such as a joystick, wand, console, steering wheel, pedal, gearshift mechanism or another type of control device. An input device 514 may include a combination of multiple different input devices, such as a video camera and a depth sensor.

In another embodiment, computer system 500 may comprise an internet of things (IoT) device in which one or more of the output device 512, input device 514, and control device 516 are omitted. Or, in such an embodiment, the input device 514 may comprise one or more cameras, motion detectors, thermometers, microphones, seismic detectors, other sensors or detectors, measurement devices or encoders, and the output device 512 may comprise a special-purpose display such as a single-line LED or LCD display, one or more indicators, a display panel, a meter, a valve, a solenoid, an actuator or a servo.

When computer system 500 is a mobile computing device, input device 514 may comprise a global positioning system (GPS) receiver coupled to a GPS module that is capable of triangulating to a plurality of GPS satellites, determining and generating geo-location or position data such as latitude-longitude values for a geophysical location of the computer system 500. Output device 512 may include hardware, software, firmware, and interfaces for generating position reporting packets, notifications, pulse or heartbeat signals, or other recurring data transmissions that specify a position of the computer system 500, alone or in combination with other application-specific data, directed toward host computer 524 or server computer 530.

Computer system 500 may implement the techniques described herein using customized hard-wired logic, at least one ASIC or FPGA, firmware, and/or program instructions or logic which, when loaded and used or executed in combination with the computer system, causes or programs the computer system to operate as a special-purpose machine. According to one embodiment, the techniques herein are performed by computer system 500 in response to processor 504 executing at least one sequence of at least one instruction contained in main memory 506. Such instructions may be read into main memory 506 from another storage medium, such as storage 510. Execution of the sequences of instructions contained in main memory 506 causes processor 504 to perform the process steps described herein. In alternative embodiments, hard-wired circuitry may be used in place of or in combination with software instructions.

The term "storage media," as used herein, refers to any non-transitory media that store data and/or instructions that cause a machine to operate in a specific fashion. Such storage media may comprise non-volatile media and/or volatile media. Non-volatile media includes, for example, optical or magnetic disks, such as storage 510. Volatile media includes dynamic memory, such as memory 506. Common forms of storage media include, for example, a hard disk, solid state drive, flash drive, magnetic data storage medium, any optical or physical data storage medium, memory chip, or the like.

Storage media is distinct but may be used with transmission media. Transmission media participates in transferring information between storage media. For example, transmission media includes coaxial cables, copper wire, fiber optics, and wires comprising a bus of I/O subsystem 502. Transmission media can also take the form of acoustic or light waves, such as those generated during radio-wave and infrared data communications.

Various forms of media may be involved in carrying at least one sequence of at least one instruction to processor 504 for execution. For example, the instructions may initially be carried on a remote computer's magnetic disk or solid-state drive. The remote computer can load the instructions into its dynamic memory and send them over a communication link such as a fiber optic, coaxial cable, or telephone line using a modem. A modem or router local to computer system 500 can receive the data on the communication link and convert the data to a format that can be read by computer system 500. For instance, a receiver such as a radio frequency antenna or an infrared detector can receive the data carried in a wireless or optical signal, and appropriate circuitry can provide the data to I/O subsystem 502, such as placing the data on a bus. I/O subsystem 502 carries the data to memory 506, from which processor 504 retrieves and executes the instructions. The instructions received by memory 506 may optionally be stored on storage 510 either before or after execution by processor 504.

Computer system 500 also includes a communication interface 518 coupled to bus 502. Communication interface 518 provides a two-way data communication coupling to network link(s) 520 that are directly or indirectly connected to at least one communication network, such as a network 522 or a public or private cloud on the Internet. For example, communication interface 518 may be an Ethernet networking interface, integrated-services digital network (ISDN) card, cable modem, satellite modem, or a modem to provide a data communication connection to a corresponding type of communications line, for example, an Ethernet cable or a metal cable of any kind or a fiber-optic line or a telephone line. Network 522 broadly represents a local area network (LAN), wide-area network (WAN), campus network, internetwork, or any combination thereof. Communication interface 518 may comprise a LAN card to provide a data communication connection to a compatible LAN, a cellular radiotelephone interface that is wired to send or receive cellular data according to cellular radiotelephone wireless networking standards, or a satellite radio interface that is wired to send or receive digital data according to satellite wireless networking standards. In any such implementation, communication interface 518 sends and receives electrical, electromagnetic, or optical signals over signal paths that carry digital data streams representing various types of information.

Network link 520 typically provides electrical, electromagnetic, or optical data communication directly or through at least one network to other data devices, using, for example, satellite, cellular, Wi-Fi, or BLUETOOTH technology. For example, network link 520 may provide a connection through network 522 to a host computer 524.

Furthermore, network link 520 may connect through network 522 or to other computing devices via internetworking devices and/or computers operated by an Internet Service Provider (ISP) 526. ISP 526 provides data communication services through a worldwide packet data communication network, Internet 528. A server computer 530 may be coupled to Internet 528. Server computer 530 broadly represents any computer, data center, virtual machine, or virtual computing instance with or without a hypervisor or computer executing a containerized program system such as DOCKER or KUBERNETES. Server computer 530 may represent an electronic digital service that is implemented using more than one computer or instance, and that is accessed and used by transmitting web services requests, uniform resource locator (URL) strings with parameters in HTTP payloads, API calls, app services calls, or other service calls. Computer system 500 and server computer 530 may form elements of a distributed computing system that includes other computers, a processing cluster, a server farm, or other organizations of computers that cooperate to perform tasks or execute applications or services. Server computer 530 may comprise one or more instructions organized as modules, methods, objects, functions, routines, or calls. The instructions may be organized as one or more computer programs, operating system services, or application programs, including mobile apps. The instructions may comprise an operating system and/or system software; one or more libraries to support multimedia, programming, or other functions; data protocol instructions or stacks to implement TCP/IP, HTTP, or other communication protocols; file format processing instructions to parse or render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. Server computer 530 may comprise a web application server that hosts a presentation layer, application layer, and data storage layer such as a relational database system using a structured query language (SQL) or no SQL, an object store, a graph database, a flat file system or other data storage.

Computer system 500 can send messages and receive data and instructions, including program code, through the network(s), network link 520, and communication interface 518. In the Internet example, server computer 530 might transmit a requested code for an application program through Internet 528, ISP 526, local network 522, and communication interface 518. The received code may be executed by processor 504 as it is received and/or stored in storage 510 or other non-volatile storage for later execution.

The execution of instructions, as described in this section, may implement a process in the form of an instance of a computer program that is being executed and consisting of program code and its current activity. Depending on the operating system (OS), a process may be made up of multiple threads of execution that execute instructions concurrently. In this context, a computer program is a passive collection of instructions, while a process may be the actual execution of those instructions. Several processes may be associated with the same program; for example, opening up several instances of the same program often means more than one process is being executed. Multitasking may be implemented to allow multiple processes to share processor 504. While each processor 504 or core of the processor executes a single task at a time, computer system 500 may be programmed to implement multitasking to allow each processor to switch between tasks that are being executed without having to wait for each task to finish. In an embodiment, switches may be performed when tasks perform input/output operations when a task indicates that it can be switched or on hardware interrupts. Time-sharing may be implemented to allow fast response for interactive user applications by rapidly performing context switches to provide the appearance of concurrent execution of multiple processes simultaneously. In an embodiment, for security and reliability, an operating system may prevent direct communication between independent processes, providing strictly mediated and controlled inter-process communication functionality.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A computer-implemented method comprising:

using one or more computing devices that are communicatively coupled to one or more internetworking devices in two or more logical layers of a multiple-layer distributed computing environment, the logical layers comprising at least an operational technology (OT) network and an information technology (IT) network, configuring one or more network firewalls in one or more of the logical layers to admit user datagram protocol (UDP) traffic on one or more specified ports, wherein the UDP traffic traverses bidirectionally through the one or more network firewalls between the OT network and the IT network;

using the one or more computing devices, setting a current logical network layer to a lowest logical layer of the multiple-layer distributed computing environment, wherein the lowest logical layer corresponds to the OT network and is a most secure layer of the two or more logical layers;

using the one or more computing devices, opening a first secure tunnel using a first internetworking stack of a first authentication service node at the current logical network layer;

using the one or more computing devices, initiating, via the first secure tunnel, secure tunnel communication between the first authentication service node and a second authentication service node at a next higher logical layer of the computing environment;

using the one or more computing devices, setting the current logical network layer to be the next higher logical layer;

using the one or more computing devices, opening a second secure tunnel using a second internetworking stack of the second authentication service node;

using the one or more computing devices, initiating, via the second secure tunnel, secure tunnel communication between the second authentication service node and a third authentication service node at a next successive higher logical layer of the computing environment that is logically higher than the next higher logical layer, wherein the next successive higher logical layer corresponds to the IT network;

using the one or more computing devices, synchronizing user access policies between the first authentication service node, the second authentication service node, and the third authentication service node using state synchronization messages communicated through the first secure tunnel and the second secure tunnel; and processing one or more user access requests via a single sign-on at the third authentication service node, the single sign-on being effective only for the third authentication service node and not for the first authentication service node and the second authentication service node.

2. The computer-implemented method of claim 1, wherein the secure tunnel is an IPsec tunnel.

3. The computer-implemented method of claim 1, wherein the lowest logical layer of the multiple-layer distributed computing environment is the OT network.

4. The computer-implemented method of claim 1, wherein the next successive higher logical layer of the multiple-layer distributed computing environment comprises any of the IT network, a demilitarized zone (DMZ), or a cloud layer.

5. The computer-implemented method of claim 1, further comprising configuring the one or more network firewalls in one or more of the logical layers to admit UDP protocol traffic on port "500" and port "4500".

6. The computer-implemented method of claim 1, wherein one or more of the initiating and the synchronizing further comprise communicating network traffic via one or more reverse proxies.

7. The computer-implemented method of claim 1, wherein one or more of the initiating and the synchronizing further comprise performing source network address translation of network traffic at the authentication service nodes.

8. One or more non-transitory computer-readable storage media storing one or more sequences of instructions which, when executed using one or more processors, cause the one or more processors to execute:

using one or more computing devices that are communicatively coupled to one or more internetworking devices in two or more logical layers of a multiple-layer distributed computing environment, the logical layers comprising at least an operational technology (OT) network and an information technology (IT) network, configuring one or more network firewalls in one or more of the logical layers to admit user datagram protocol (UDP) traffic on one or more specified ports, wherein the UDP traffic traverses bidirectionally through the one or more network firewalls between the OT network and the IT network;

using the one or more computing devices, setting a current logical network layer to a lowest logical layer of the multiple-layer distributed computing environment, wherein the lowest logical layer corresponds to the OT network and is a most secure layer of two or more logical layers;

using the one or more computing devices, opening a first secure tunnel using a first internetworking stack of a first authentication service node at the current logical network layer;

using the one or more computing devices, initiating, via the first secure tunnel, secure tunnel communication between the first authentication service node and a second authentication service node at a next higher logical layer of the computing environment;

using the one or more computing devices, setting the current logical network layer to be the next higher logical layer;

using the one or more computing devices, opening a second secure tunnel using a second internetworking stack of the second authentication service node;

using the one or more computing devices, initiating, via the second secure tunnel, secure tunnel communication between the second authentication service node and a third authentication service node at a next successive higher logical layer of the computing environment that is logically higher than the next higher logical layer, wherein the next successive higher logical layer corresponds to the IT network;

using the one or more computing devices, synchronizing user access policies between the first authentication service node, the second authentication service node, and the third authentication service node using state synchronization messages communicated through the first secure tunnel and the second secure tunnel; and processing one or more user access requests via a single sign-on at the third authentication service node, the single sign-on being effective only for the third authentication service node and not for the first authentication service node and the second authentication service node.

9. The one or more non-transitory computer-readable storage media of claim 8, wherein the secure tunnel is an IPsec tunnel.

10. The one or more non-transitory computer-readable storage media of claim 8, wherein the lowest logical layer of the multiple-layer distributed computing environment is the OT network.

11. The one or more non-transitory computer-readable storage media of claim 8, wherein the next successive higher logical layer of the multiple-layer distributed computing environment comprises any of the IT network, a demilitarized zone (DMZ), or a cloud layer.

12. The one or more non-transitory computer-readable storage media of claim 8, further comprising one or more sequences of instructions which, when executed using one or more processors, cause the one or more processors to execute configuring the one or more network firewalls in one or more of the logical layers to admit UDP protocol traffic on port "500" and port "4500".

13. The one or more non-transitory computer-readable storage media of claim 8, wherein the sequences of instructions for one or more of the initiating and the synchronizing further comprise one or more sequences of instructions which, when executed using one or more processors, cause the one or more processors to execute communicating network traffic via one or more reverse proxies.

14. The one or more non-transitory computer-readable storage media of claim 8, wherein the sequences of instructions for one or more of the initiating and the synchronizing further comprise one or more sequences of instructions which, when executed using one or more processors, cause the one or more processors to execute performing source network address translation of network traffic at the one or more network firewalls.

* * * * *